(12) United States Patent
Guo et al.

(10) Patent No.: US 10,118,433 B2
(45) Date of Patent: Nov. 6, 2018

(54) DEVICE FOR DISPENSING CHEMILUMINESCENT SOLUTION

(71) Applicants: Imperial Toy LLC, North Hills, CA (US); Maggilume, LLC, Kenwood, CA (US); OmniTech Innovations Co., Ltd., Ningbo (CN)

(72) Inventors: Cheng Guo, Scarsdale, NY (US); Ami N. Shapiro, Granada Hills, CA (US)

(73) Assignees: IMPERIAL TOY LLC, North Hills, CA (US); MAGGILUME, LLC, Kenwood, CA (US); OMNITECH INNOVATIONS CO., LTD., Ningbo (CN)

( * ) Notice: Subject to any disclaimer, the term of this patent is extended or adjusted under 35 U.S.C. 154(b) by 35 days.

(21) Appl. No.: 15/274,904

(22) Filed: Sep. 23, 2016

(65) Prior Publication Data

US 2017/0087920 A1    Mar. 30, 2017

Related U.S. Application Data

(60) Provisional application No. 62/233,227, filed on Sep. 25, 2015.

(51) Int. Cl.
*B43K 1/00* (2006.01)
*B43K 5/00* (2006.01)
*B43K 1/01* (2006.01)

(52) U.S. Cl.
CPC .............. *B43K 1/01* (2013.01); *B43K 1/006* (2013.01); *B43K 5/00* (2013.01)

(58) Field of Classification Search
CPC .............................. B43K 1/006; B43K 5/1845

USPC ........................... 401/132–135, 206; 362/34
See application file for complete search history.

(56) References Cited

U.S. PATENT DOCUMENTS

| 3,584,211 | A | * | 6/1971 | Rauhut | .................... | F21K 2/06 |
| | | | | | | 222/541.6 |
| 8,485,749 | B2 | * | 7/2013 | Orem | ...................... | B43K 1/12 |
| | | | | | | 401/198 |
| 2010/0047005 | A1 | * | 2/2010 | Harada | .................... | B43K 8/00 |
| | | | | | | 401/47 |

* cited by examiner

*Primary Examiner* — David Walczak
*Assistant Examiner* — Joshua Wiljanen
(74) *Attorney, Agent, or Firm* — Snell & Wilmer L.L.P.

(57) ABSTRACT

Devices have a flexible housing with an inside chamber having a closed and open end. A first chemiluminescent fluid is disposed in a breakable container in the chamber, and a second chemiluminescent fluid is in the chamber. A tip assembly is attached to the housing and includes a nib movably disposed in the body, and a filter element may be positioned within the body to prevent passage of broken particles from the container to the nib tip. A resilient element is used to impose an outward biasing force on the nib. A porous material is disposed over an outer surface of the nib tip and securely held in place. The device is activated for use by bending the housing to break the container causing the first and second chemiluminescent fluids to mix and react, providing a chemiluminescent solution that flows to the tip assembly for dispensing onto a desired surface.

19 Claims, 6 Drawing Sheets

DEVICE FOR DISPENSING CHEMILUMINESCENT SOLUTION

CROSS-REFERENCE TO RELATED APPLICATIONS

This patent application claims the benefit of U.S. Provisional Patent Application No. 62/233,227 filed Sep. 25, 2015, which is hereby incorporated by reference in its entirety.

FIELD

This invention relates to a device containing chemiluminescent fluid components, and configured to accommodate mixing of the fluid components to produce a chemiluminescent solution, and enabling the solution to be dispensed from the device onto a desired object or substrate.

BACKGROUND

The existence of devices which emit chemiluminescent light responsive to mixing of two or more liquid components is known in the art. Such known devices are provided in the form of a bendable translucent tube that contains the liquid components both prior to and after combining. Once the components are combined, a chemical reaction takes place that produces a chemiluminescent light which shines through the tube for practical and/or ornamental purposes. Accordingly, the chemiluminescent fluid components are retained in a tube or other container after mixing.

There also exists devices known in the art for providing chemiluminescent light from a chemical reaction of suitable compounds including a fluorescent compound. Such known devices may be utilized as either a self-contained light unit or a chemiluminescent dispensing unit. Such device allows the chemiluminescent reaction product to be dispensed and used as a chemiluminescent marker wherein the device is provided in the form of a tube having an opening through which the chemiluminescent material can be poured or squeezed by the user onto a surface.

Deficiencies associated with such known device that is capable of dispensing the chemiluminescent material is that there is no positive control over the amount of material to be dispensed. In other words, either an excess or deficiency of product dispensed is highly probable, making the device relatively unsuited to for use as a marker or for drawing or decorating clothing and other objects or substrates. Additionally, the nature of the chemiluminescent material that is used in such known devices is not one that is chemically safe for use, e.g., by a user dispensing the chemiluminescent material where there is a high probably of the chemiluminescent material coming into direct contact with the skin of a user.

It is, therefore, desired that a device be constructed in a manner that facilitates dispensing of a chemiluminescent material therefrom in a controlled manner. It is further desired that the chemiluminescent components used with such device produce a chemiluminescent material or solution that is relatively safe for use so that is does not present a health or safety risk.

SUMMARY

Devices for dispensing chemiluminescent solution as disclosed here may be referred to as marking devices and comprise an elongate hollow housing having an inside chamber and that extends from a housing first end to a housing second end. In an example, the housing first end is closed. A first chemiluminescent fluid is disposed within a breakable container and the breakable container is disposed within the inside chamber. A second chemiluminescent fluid disposed is also within the inside chamber. In an example, the first chemiluminescent fluid is an activator solution, and the second chemiluminescent fluid is an oxalate solution, and the activator solution may be an aqueous solution. In an example, the housing is formed from a flexible material, and the breakable container is sized having an outside diameter at least 60 percent, and 75 to 90 percent, that of inside chamber inside diameter.

The marking device includes a tip assembly attached to the housing second end. The tip assembly comprises a hollow body connected with the housing second end, wherein the body has a first end and a second end, and wherein the body first end is positioned adjacent the inside chamber and the body second end is positioned adjacent a peripheral edge of the housing second end. In an example, an inside surface of the housing second end and an outside surface of the body first end each have one or more surface features that register with one another to provide a locking attachment therebetween. In an example, the body comprises one or more locking elements that extend axially away from the body first end and that form a locking attachment with the housing inside chamber. In an example, the housing includes a seat positioned adjacent an end of the inside chamber and extending radially inwardly a partial distance into the inside chamber, wherein the body first end is disposed adjacent the seat.

The tip assembly includes a nib that is movably disposed in the body and that includes a first end extending towards the housing and a second end extending towards the body second end, wherein the second end includes a tip that extends outwardly from the body second end. In an example, the body comprises a reduced diameter section adjacent the body second end, and the nib includes a radially outwardly projecting flange between the nib first and second ends. In an example, a filter element may be positioned within the body between the nib and an inside surface of the body for preventing the passage of any particles to the nib tip. In an example, the nib second end comprises a constant diameter section to permit a degree of inward and outward travel of the nib within the body second end.

The tip assembly includes a resilient element disposed within the body that imposes a biasing force on the nib urging the nib towards the body second end. In an example, the resilient element is a spring that extends between the body first end and the nib second end. A porous material is disposed over an outer surface of the nib tip and the body second opening, and a ring element is disposed over the porous material and attached with the body second end such that the porous material is securely interposed in place in the tip assembly between the body and the ring.

The marking device is activated for use by bending or deforming the housing to cause the breakable container to break and there enable the first and second chemiluminescent fluids to be mixed together and react to provide a chemiluminescent solution that flows from the internal chamber to the tip assembly, and that is dispensed from the marking device by contacting the tip assembly against a desired surface to be marked.

BRIEF DESCRIPTION OF DRAWINGS

These and other features and advantages of devices for dispensing a chemiluminescent material as disclosed herein will be appreciated as the same becomes better understood by reference to the following detailed description when considered in connection with the accompanying drawings wherein.

DESCRIPTION

Devices for dispensing a chemiluminescent solution to onto an object or substrate as disclosed herein comprises a body or housing having an inside or internal chamber for accommodating first and second chemiluminescent fluids therein in both isolated states prior to use and in a combined state for use for dispensement by the device. The device includes a tip assembly that is specially engineered to facilitate dispensing the chemiluminescent solution, formed by mixing together of the first and second chemiluminescent fluids in the housing, in a controlled manner onto a variety of different objects or substrates that may include stationary, fabric, clothing, signage, packaging materials, or the like. Configured in this manner, the device ensures controlled delivery and dispensement of the chemiluminescent solution, and also ensures that any broken portions or pieces of an element used to isolate one of the chemiluminescent fluids in the housing do not impair such controlled delivery and dispensement. Further, in an example embodiment, one or both of the chemiluminescent fluids used with the device to form the chemiluminescent solution are aqueous based to provide a desired level of user health safety once dispensed.

Figure 1:
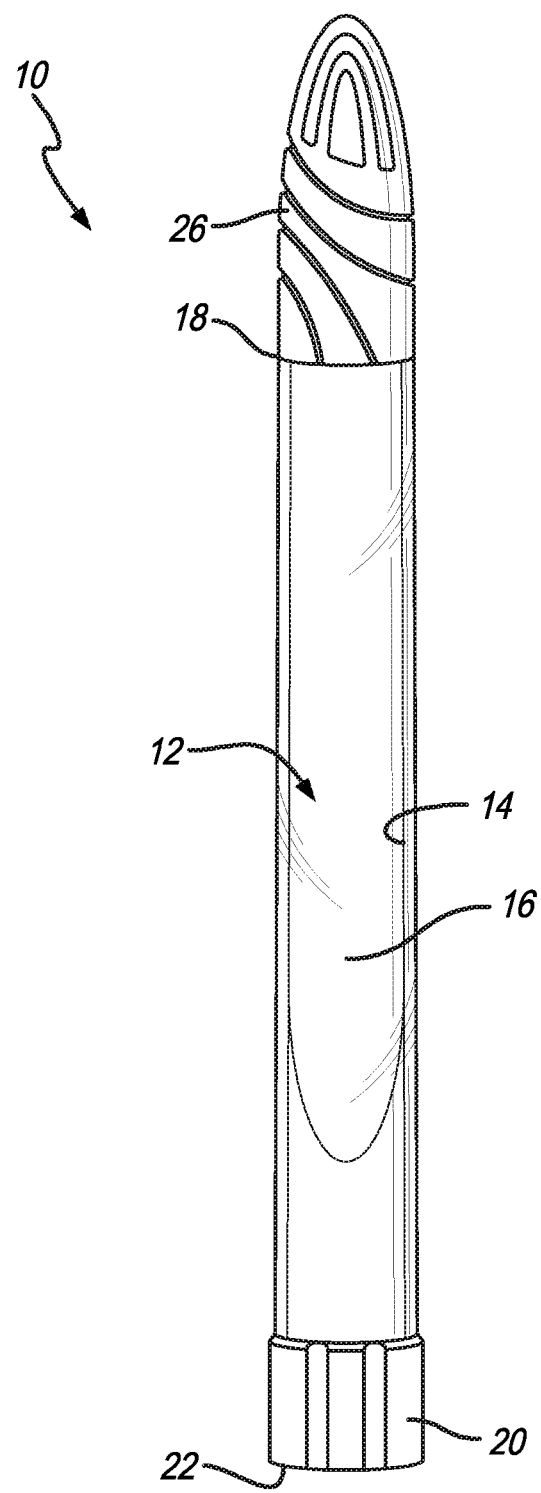
FIG. 1 is a perspective side view of an example device for dispensing a chemiluminescent solution as disclosed herein.

FIG. 1 illustrates an example embodiment marking device 10 as disclosed herein comprising a housing or body 12 that includes an internal chamber 14 defined by a sidewall construction 16 that extends a length sufficient to provide a desired internal chamber volume for accommodating first and second chemiluminescent fluids. In an example, the housing 12 is configured having a cylindrical sidewall 16 that extends to first and second axial ends 18 and 20. The housing is formed from a bendable material such as a polymeric material that may include polyethylene, polypropylene and combinations thereof to enable a user to bend the housing an amount sufficient to break a container disposed within the housing that accommodates one of the first or second chemiluminescent fluids to cause the chemiluminescent fluid to be released therefrom and be mixed with the other of the first or second fluid contained in the internal chamber to react and form the chemiluminescent marking solution. It is also desired that the material used to form the housing be one that can accommodate the desired degree of bending while maintaining its structural integrity so as not to leak or release glass shards from the broken container.

Figure 3:
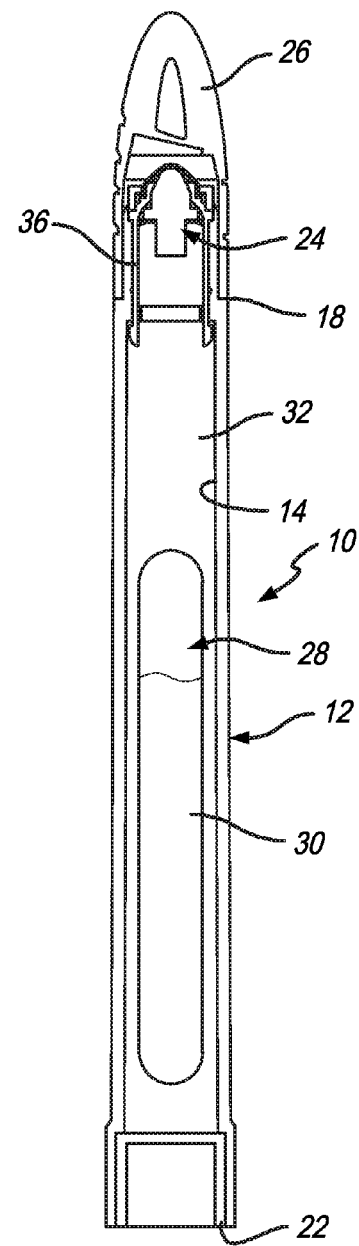
FIG. 3 is a cross-sectional side view of the device for dispensing a chemiluminescent solution shown in FIG. 2.
Figure 4A:
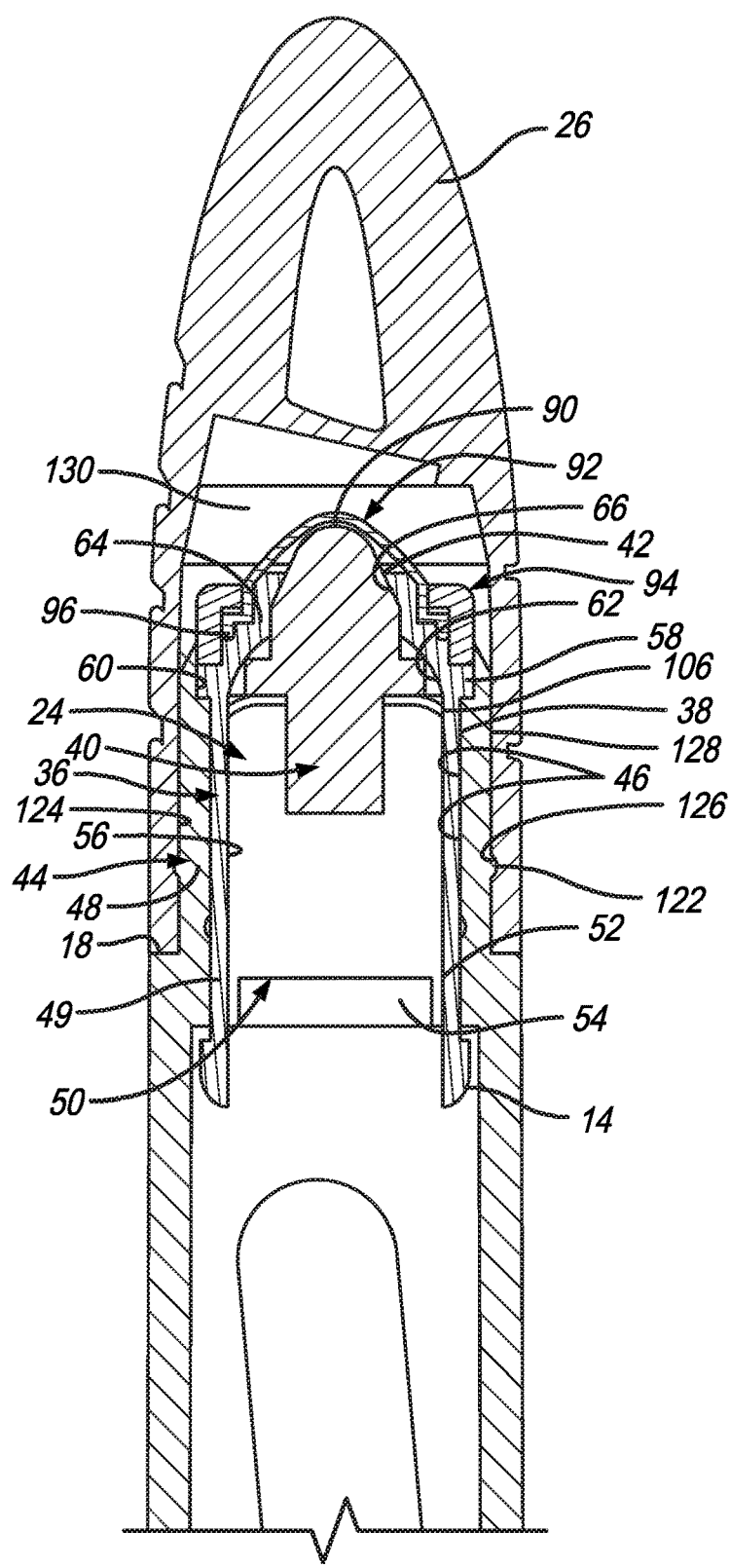
FIGS. 4A and 4B are a cross-sectional side views illustrating a first example tip assembly of the device for dispensing a chemiluminescent solution shown in FIG. 3.
Figure 4B:
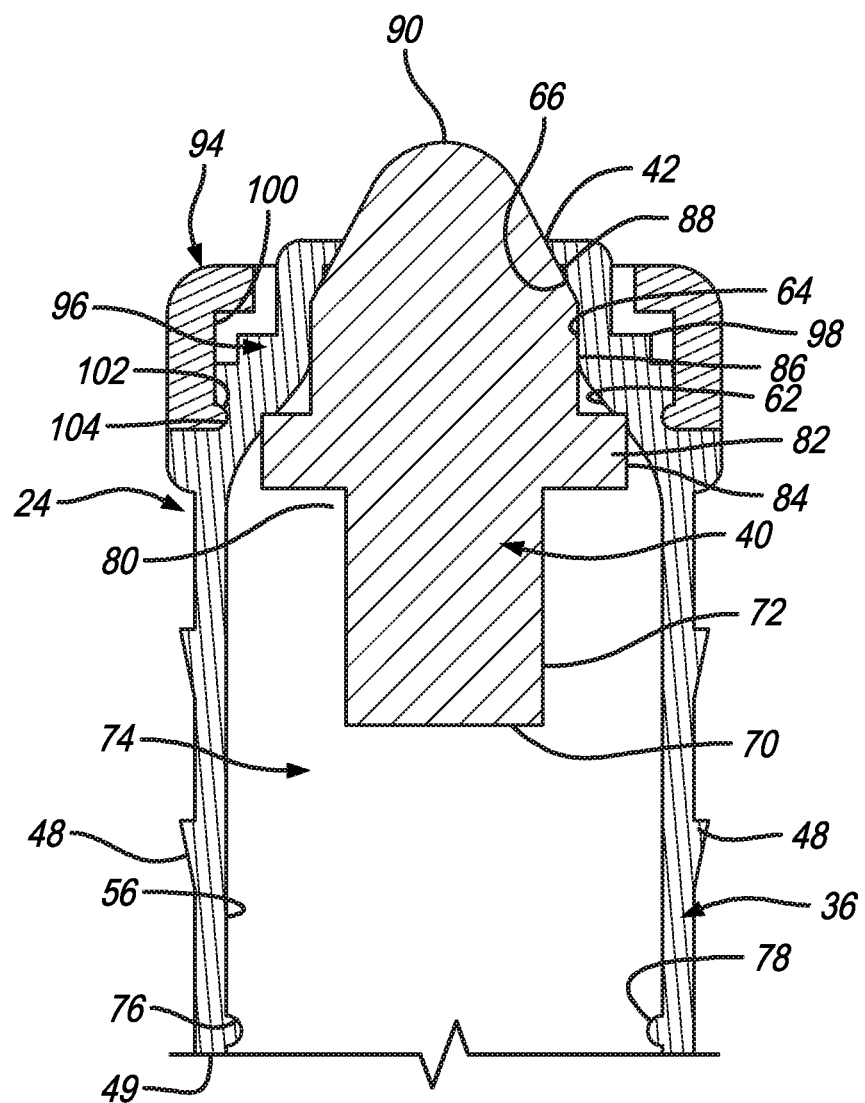

In an example, the marking device 10 includes an end cap 22 that is attached to the second axial end 20 to form a leak-tight seal therewith to close the second end, and includes a tip assembly (24 as illustrated in FIGS. 3, 4A and 4B) attached to the first axial end 18. A cover or top cap 26 is releasibly disposed over the tip assembly to protect the tip assembly when the marking device is not being used. The end cap 22 and the top cap 26 may be formed from the same types of materials useful for forming the housing or may be formed from different materials. In an example, the end cap and top cap are formed from polymeric or plastic materials.

Figure 2:
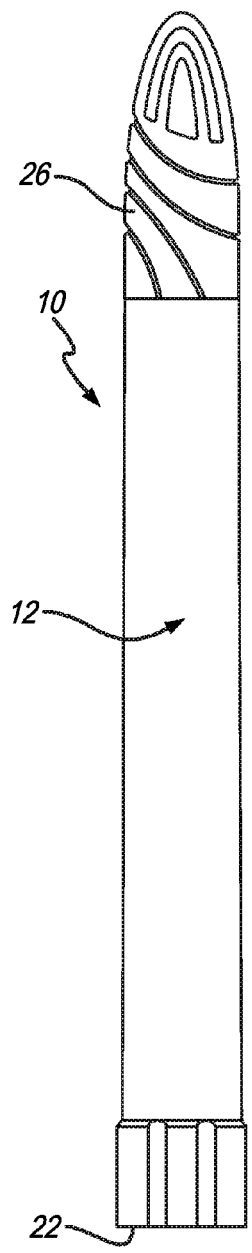
FIG. 2 is a side view of the device for dispensing a chemiluminescent solution shown in FIG. 1.

FIGS. 2 and 3 illustrate the marking device 10 showing the housing 12, the end cap 22 and the top cap 26. FIG. 3 illustrates some of the internal features of the device 10 such as the internal chamber 14, and a container 28 disposed within the chamber that accommodates a volume of a first or second chemiluminescent fluid 30 therein. In an example, the container 28 is provided in the form of an ampule that is made from glass and is configured to be broken by bending of the housing a sufficient amount so as to cause the glass ampule to break and release the chemiluminescent fluid 30 into the internal chamber. The internal chamber contains a volume of the other of the first or second chemiluminescent fluid 32 disposed therein so that upon breaking the container both the first and second chemiluminescent fluids 30 and 32 combined to form the desired chemiluminescent marking solution. In an example, the container 28 is cylindrical, concentrically disposed within housing inside diameter, and has a diameter that is from about 30 to 90 percent, and 50 to 80 percent of the inside diameter of the inside chamber 14. In a preferred embodiment, the container 28 has a diameter that is approximately 75 percent of the inside diameter of the inside chamber.

In an example, the housing 12 includes a volume of the first chemiluminescent fluid 32, the contents and chemistry of which will be descried in better detail below, and the container 28 contains a volume of the second chemiluminescent fluid 30, the contents and chemistry of which will be descried in better detail below. The volume of each respective first and second chemiluminescent fluid present in the housing is such as to provide a desired stoichiometry to ensure sufficient and complete reaction useful for forming the chemiluminescent marking solution having a desired chemiluminescent or glow effect for dispensement. In an example, the first chemiluminescent fluid may be referred to as the activator as better described below, and the second chemiluminescent fluid may be referred to as the oxalate as better described below.

FIG. 3 illustrates the tip assembly 24 that is attached to the first axial end 18 of the housing, and as noted above that is specially engineered to facilitate the controlled delivery of the chemiluminescent solution from the housing internal chamber. FIGS. 4A and 4B illustrate in better detail the different elements of the tip assembly shown in FIG. 3. The tip assembly 24 includes a hollow body 36 defined by an outer sidewall construction 38 that projects outwardly a distance from the housing, and that includes a nib 40 movably disposed within a dispensement opening 42 of the body.

Referring to FIGS. 4A and 4B, in an example, the body 36 sidewall construction 38 is configured to nest concentrically within an annular sleeve 44 of the housing that extends axially outwardly a distance from the first axial end 18. The housing annular sleeve 44 is configured to accommodate a majority of the tip body 36 therein, which is greater than about 50 percent, and preferably greater than about 60 percent of the total body length. Configured in this manner, the sleeve 44 operates to provide desired mounting stability to the tip assembly, and also operates to reduce the possibility of unwanted leakage of the chemiluminescent solution between the body and the sleeve. The sleeve 44 includes surface features 46 disposed along its inner surface that are configured to complement and accommodate surface features 48 disposed along the body sidewall construction 38. The respective surface features 46 and 48 may be configured to provide an improved degree of mechanical engagement between the respective sleeve and body, and in a preferred embodiment the surface features are configured to provide a locked engagement therebetween once the body 36 is placed within the sleeve 44, and also to minimize or eliminate unwanted chemiluminescent solution leak paths therebetween. In an example, the body surface features 48 may be in the form of one or more outward projections extending circumferentially around the body at different axial locations, and the sleeve surface features 44 may be in the form of complementary recesses to accommodate placement of the projections therein. In an example, the body surface features are configured having a shape that not only provides a desired mechanical attachment, but also operates to prevent leaking of the chemiluminescent solution between the housing and the body. In an example, as illustrated in FIGS. 4A and 4B, the surface features 48 are in the form of an angular or triangular-shaped projection that cooperate with similarly configured surface features 46 in the sleeve to provide an improved degree of leak protection.

The body 36 includes a base 49 along a body open axial end 50 that is positioned against a seat or ridge 52 that projects radially inwardly a partial distance from the housing internal chamber 14, and that operates to limit the placement depth of the body 36 within the sleeve 44, while still providing an opening 54 from the internal chamber to facilitate the flow of the chemiluminescent solution into the tip assembly 24. Moving upwardly within the body 36 from the base 49, the body comprises a first diameter section 56 that has a substantially constant inside diameter. In an example, the body first diameter section 56 has a length that is similar to that of the housing sleeve 44. In an example, the body first diameter section 56 extends along greater than about 50 percent, and preferably greater than about 60 percent, of the total axial length of the body. The body 36 includes a flange 58 that extends circumferentially and radially outwardly a distance from the sidewall construction at a position that is adjacent an end of the first diameter section 56. The flange 58 is seated within a recess 60 adjacent an axial end of the sleeve 44 and operates to also limit the placement position of the body within the sleeve.

The body includes a first tapered section 62 that extends from the first diameter section 56 to a second diameter section 64, wherein the first tapered section 62 is characterized by a reducing diameter moving from the first diameter section 56. In an example, the reduction in diameter is gradual and may be characterized by an angle of from about 15 to 45 percent relative to an axis running longitudinally through the body. The body second diameter section 64 has a constant diameter that is less than that of the first diameter section 56, and that is sized to accommodate axially movable placement of a section of the nib 40 therein. The body includes a second tapered section 66 extending from the second diameter section 64 that is tapered inwardly and that terminates to form the body open end 42 that a portion of the nib 40 is disposed therethrough and projects outwardly therefrom. In an example embodiment, the body second tapered section 66 has a straight profile with an angle of deflection from about 15 to 45 degrees relative to an axis running longitudinally through the body.

Still referring to FIGS. 4A and 4B, the nib 40 is disposed within the body 36 and, in a preferred embodiment, has a generally cylindrical construction with a number of different surface features that are configured to cooperate with certain sections of the body. The nib may be formed from any type of material capable of functioning in the manner intended to dispense the chemiluminescent solution and to form a desired seal to provide a degree of control over dispensing the chemiluminescent solution. The seal formed by the nib also operates to prevent leaking of the chemiluminescent solution through the tip during transport and/or storage of the product. In an example, the nib may be formed from a polymeric and/or rubber material and, in a preferred embodiment the nib is formed from a thermoplastic rubber. In an example, the thermoplastic rubber used to form the nib may have a hardness of from 60 to 90 durometer.

Referring to FIG. 4B, the nib 40 includes a base 70 at one axial end, and a first diameter section 72 that extends a distance axially away and upwardly from the base 70. The first diameter section is configured to accommodate attachment with a biasing member 74 therewith to impose a biasing force on the nib urging the nib away from the housing 12 and towards the body open end 42. In an example, the first diameter section 72 extends along about 25 to 50 percent of the total axial length of the nib to provide a desired attachment contact with the biasing member 74. In an example, the biasing member may be provided in the form of a spring or the like. In an example, the biasing member 74 is a coil spring that is made from stainless steel, wherein a first axial end 76 of the spring is positioned against an inward ridge 78 extending circumferentially around the base first diameter section 56 adjacent the body base 49, and a second axial end 80 is attached around the nib first diameter section 72. In an example, the spring 74 is designed to provide a desired degree of biasing force onto the nib to allow a slight degree of axial movement of the nib from the body open end 42 so as to permit a desired flow of the chemiluminescent solution from the tip assembly during use, e.g., when the nib is pressed against an object or substrate to be marked.

The nib 40 first diameter section 72 extends to a flange 82 that projects radially outward a distance and extends circumferentially around the nib. In an example, the flange 82 has a constant diameter defined by a cylindrical wall surface 84 and has an axial thickness. The flange diameter is sized so that a portion of the flange, e.g., a square edge, contacts an inside wall surface of the body first tapered section 62 to both limit the outward axial movement of the nib from the biasing member, and to provide a seal within the body, between the nib and the body, to minimize or stop the flow of the chemiluminescent solution from the tip assembly. Accordingly, the flange 82 is sized having a diameter that is greater than at least a portion of the body tapered diameter section 62 to achieve this purpose.

The nib 40 includes a second diameter section 86 that extends axially a length from the flange 82 to a nib tapered section 88. In an example, the second diameter section 86 is sized having a diameter that is less than that of the flange 82 and greater than that of the nib first diameter section 72. In an example, the nib second diameter section 86 has a diameter sized to fit within the body second diameter section 64 in a manner enabling the nib to move axially therein. In an example embodiment, the tolerance may be greater than about 0.05 mm, and in the range of from about 5.45 to 5.55 mm. In an example, the axial length of the nib second diameter section 86 is sufficient to provide a desired degree of stability and guidance to the nib relative to the body when the nib is displaced in the body during use. In an example embodiment, a desired flow of the chemiluminescent solution occurs when the nib second diameter section 86 is retracted so that it is free from the body second diameter section 64 to thereby permit passage of the chemiluminescent solution for dispensing.

The nib includes a tapered section 88 that extends axially from the second diameter section 86 and that is tapered radially inwardly moving from the second diameter section 86 to a tip 90 of the nib. In an example, that tapered section 88 has a straight profile with an angle of deflection that complements or that is the same as the body second tapered section 66, e.g., from about 15 to 45 degrees relative to an axis running longitudinally through the body. The outward axial position of the nib relative to the body is limited by the contact between the nib tapered section 88 against the body second tapered section 66, which also acts to form a seal to prevent the passage of the chemiluminescent solution from the tip assembly. This seal is in conjunction with the other internal seal provided by the contact between the nip flange and the body first tapered section. As noted briefly above, once the nib is depressed inwardly so that the nib second diameter section 86 is clear of the body second diameter section 64, the chemiluminescent solution is permitted to flow thereby and is disposed on the onto the nib tapered section 88 for dispensing onto a desired object, surface or substrate.

The nib includes a tip 90 at an end opposite the base 49 that that has a rounded configuration defined by a radius of curvature extending between diametrically opposed end portions of the tapered section 88. In an example, it is desired that the tip have a radius of curvature designed to provide a desired delivery volume and thickness of the chemiluminescent marking solution when in use. In an example, the tip has a radius of curvature from about 2 to 10 mm.

Referring back to FIG. 4A, the tip assembly 24 further comprises a porous element 92 that is disposed over the nib tip 90 and that forms the dispensing surface or tip of the device. In an example, the porous element 92 may be formed from any type of material capable of enabling the diffusion or passage of the chemiluminescent solution from the nib tip therethrough for marking a desired substrate or object. In an example, the porous element is provided in the form of a piece of material which may or may not be woven. In a preferred embodiment, the porous material is a nonwoven polypropylene mesh. The porous element 99 is held in place on the tip assembly 24 against the nib tip 90 by use of an annular ring 94 that is placed over the peripheral edge of the porous element 92 and that operates to sandwich and trap the peripheral edge of the porous element 92 between the annular ring 94 and adjacent outside surface section 96 of the body 36.

Referring to FIG. 4B, the body outside surface section 96 is located concentrically around and adjacent to the body open end 42, and has one or more surface features 98 that are configured to complement one or more surface features 100 of the annular ring 94 to mechanically lock the porous element therebetween. In an example, the body outside surface section surface features 98 are provided as a 90 degree ridge defined formed between different diameter sections. The annular ring surface features 100 includes a complementary 90 degree ridge formed between different diameter sections. The complementary body and ring surface features are sized so as to provide a desired clearance or tolerance therebetween, when the ring 94 is installed on the body, to accommodate placement of the porous element therebetween to trap it without damaging it. Also, the ring 94 is configured to form a locking attachment with the body when placed therein over the porous element. In an example, the locking attachment is provided by the placement of a radially inwardly directed rib 102, positioned an at axial end of the ring, within a groove 104 disposed along the body outside surface section 96. Configured in this manner, once the porous element is interposed between the body and the ring, the ring is lowered onto the body and locked into position by cooperation of the rib in the groove.

In an example, the device as disclosed herein may optionally include means for controlling the migration of any pieces of broken glass or the like from the chemiluminescent fluid container so as not to interfere with the controlled dispensement of the chemiluminescent solution from the tip assembly. Referring to FIG. 4A, in an example, the means for controlling can be provide in the form of a restrictive member 106 configured to facilitate the passage of the chemiluminescent solution from the housing to the tip assembly for dispensement, yet prevent the passage of any such glass pieces. The restrictive member 106 may be provided in the form of a porous material that is positioned within the device downstream from the section of the nib that makes contact with the body, so as to not interfere with the internal sealing mechanisms provided between contacting sections of the nib and body described above. In an example, the restrictive member 106 is a porous material in the form of felt or the like. The restrictive element in addition to protecting against unwanted passage of glass particles or the like that could interfere with internal sealing within the tip assembly, may provide a desired degree of control over the flow of the chemiluminescent solution into the tip assembly for dispensement. The restrictive element in such example is provided in the form of an annular washer that is positioned over the nib 40 around the first diameter section 72 and against the flange 82, and that has an outside diameter greater than that of the body first diameter section 56 to thereby block passage of any broken glass therebetween. It is to be understood that this is but one example of a configuration of the restrictive member and where it may be placed within the device, and other configurations and placements that operate to achieve the same purpose are intended to be within the scope of the device as disclosed herein.

As noted above and illustrated in FIG. 4A, the tip assembly body 36 is configured having one or more surface features 48 configured to cooperate with surface features 46 of the housing sleeve 44 to provide a mechanical attachment therebetween. While the example illustrated in FIGS. 4A and 4B makes use of two surface features 48, it is to be understood that the use of more than two surface features 48 is to be within the scope of the device as disclosed herein, wherein the housing may or may not include one or more cooperating surface features 46. For example, the device as illustrated in FIGS. 5A to 5B comprises a tip assembly comprising three surface features for cooperating with the housing sleeve.

Figure 5A:
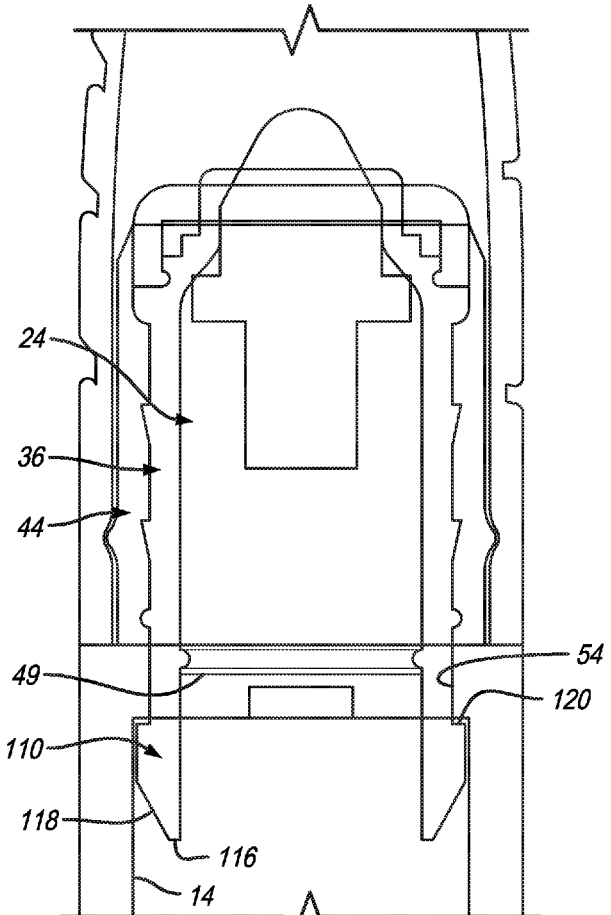
FIGS. 5A to 5C are cross-sectional side and side views illustrating an example tip assembly of the device for dispensing a chemiluminescent solution shown in FIG. 3.
Figure 5B:
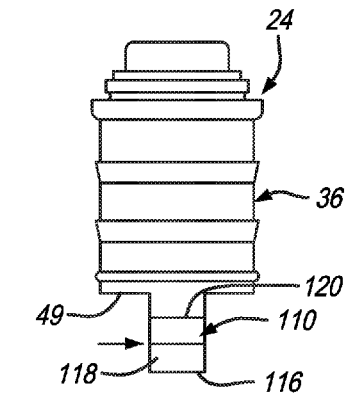
Figure 5C:
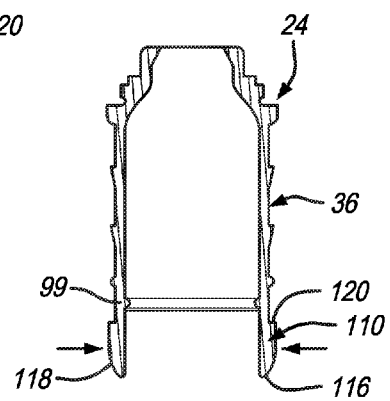

Referring to FIGS. 5A to 5C, the device as disclosed herein may include additional features for securing attachment of the tip assembly 24 to the housing. For example, in addition to the surface features described above, the tip assembly body 36 may include one or more attachment members 110 that are integral to the body and that project axially away from a base 49 of the body into a region of the housing internal chamber 14 when the body is nested within the housing sleeve 44. In an example, the body may be configured having two or more such attachment members 110 that are configured to make a mechanical attachment with a surface feature within the housing internal chamber. In the example illustrated in FIGS. 5A to 5C, the body 36 is configured comprising a pair of attachment members 110 diametrically opposed from one another and that include ends 116 each having a leading tapered surface 118 (to ease transition over a surface feature of the housing) and a recessed ridge 120 downstream from the tapered surface to form a mechanically locked attachment with a surface feature of the housing once the body fully disposed within the housing sleeve. Configured in this manner, as the tip assembly is disposed within the sleeve, the attachments members may deflect inwardly until displaced further when the recessed ridge snaps into place one it passes the housing opening 54 and is locked into place. It is to be understood that this is but one example of a configuration of the one or more attachment members, and other configurations and placements that operate to achieve the same purpose are intended to be within the scope of the device as disclosed herein.

Referring back to FIG. 4A, the device comprises a cover or top cap 26 that is releasibly disposed over the tip assembly to protect the tip assembly 24 when the marking device 10 is not being used. In an example, the top cap 26 includes one or more surface features 122 disposed along an inside surface 124 that is configured and positioned to cooperate with one or more surface features 126 disposed along an outside surface 128 of the housing sleeve 44. In an example embodiment, the cooperative surface features between the top cap and sleeve are a recessed groove 122 and a projecting ridge 126, respectively. The top cap 26 has an inside cavity 130 configured to accommodate placement of the otherwise exposed elements of the tip assembly to protect them from damage, and to provide a sealed attachment with the housing, when the top cap is attached thereon.

The example device described above is constructed by forming the tip assembly 24 by placing the nib 40 in the body 36 with the restrictive member 106, installing the biasing member 74 between the nib 40 and within the body, placing the porous element 92 over the tip of the nib and securing the same to the body by snapping the annular ring 94. The tip assembly is then displaced into the housing sleeve 44 and snapped in place by cooperation of the body and sleeve surface features and optionally the attachment members 110, thereby also forming a leak-tight seal with the housing. The container 28 that contains a desired volume of the first chemiluminescent fluid is placed in the housing internal chamber 14 through the housing end 20, and a desired volume of the other of second chemiluminescent fluid is placed into the internal chamber. The end cap 22 is disposed within the housing open end 20 and is sealed therewith by conventional means, and in an example embodiment is heat-sealed to the housing open end 20 to form a leak-tight seal therewith.

The device constructed as disclose herein is readied for use by first grasping the housing and bending it a sufficient amount to break the container disposed therein causing the first chemiluminescent fluid within the container to combine and react with the second chemiluminescent fluid in the internal chamber. Shaking the device may be useful to assist in mixing the chemiluminescent fluids together to form the chemiluminescent solution. The top cap is removed from the housing to expose the tip assembly and the user can dispense the chemiluminescent solution onto a desired object or substrate by placing the tip against the desired object or substrate and press down on the tip, causing the nib to retract against the biasing force to release the seals within the tip assembly to cause the chemiluminescent solution to travel to the tip assembly for dispensement.

Figure 6:
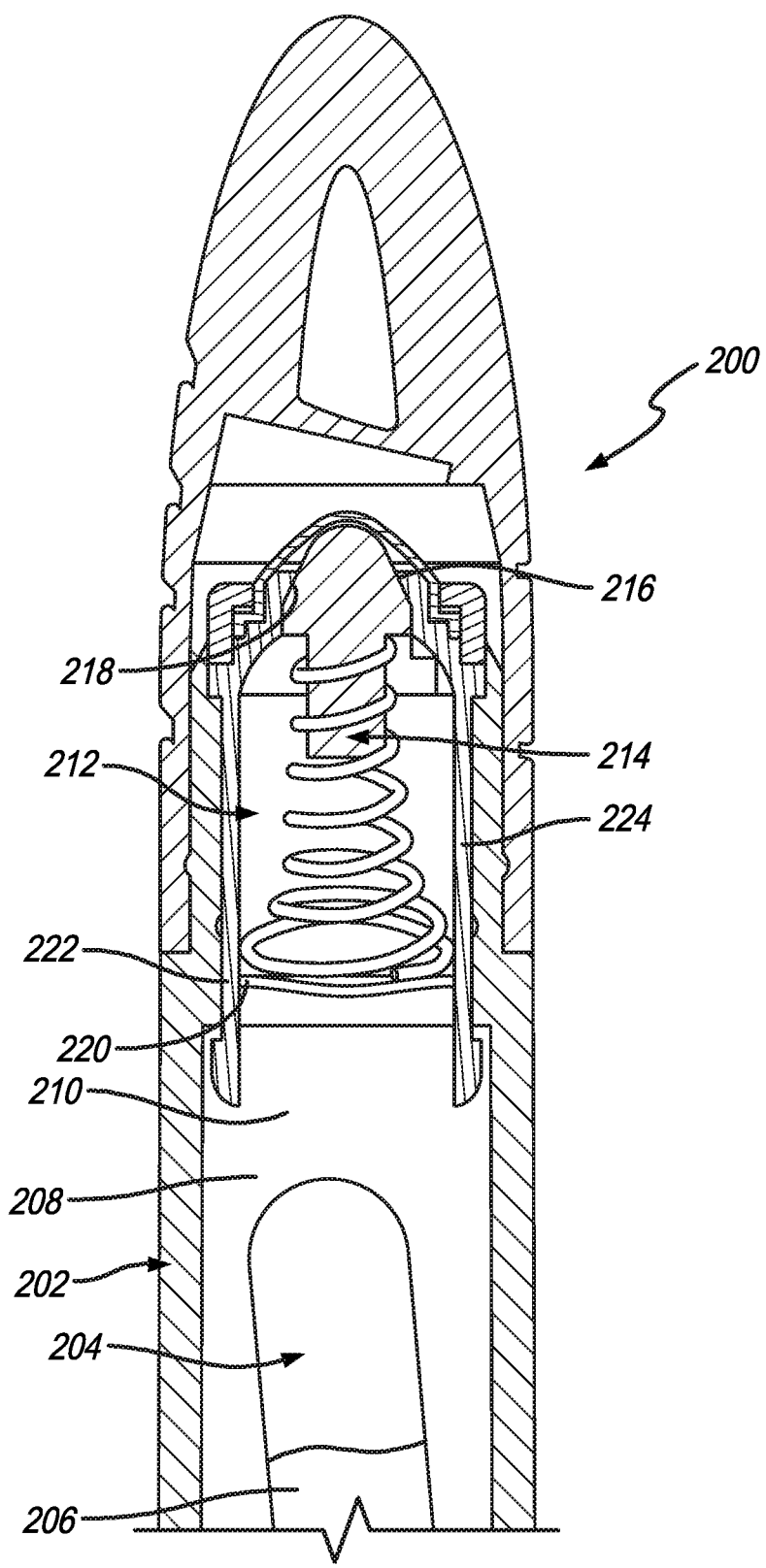
FIG. 6 is a cross-sectional side view illustrating a second example tip assembly of the device for dispensing a chemiluminescent solution as disclosed herein.

FIG. 6 illustrates another example marking device 200 as disclosed herein that is somewhat similar to the example described above, but with the following differences. The device 200 comprises the same housing 202 as described above, containing the container 204 of one of two chemiluminescent fluids 206 and a volume of the other of two chemiluminescent fluids 208 in the internal chamber 210, and a tip assembly 212 is attached to the housing. The nib 214 in this example is configured differently than that described above in that it does not include a flange. Thus, there is only one internal seal provided in the tip assembly 212, which seal is provided by the interaction of the nib tapered section 216 and the body second tapered section 218. Additionally, the restrictive member 220 in this example is provided along the base 222 of the nib body 224 and interposed between the body and the housing to thereby restrict the flow of any particles from the broken container from the internal chamber 110 to the tip assembly 212.

The first and second chemiluminescent fluids used for making the chemiluminescent solution of the marking device as disclosed herein may include those disclosed in US Patent Application US Patent Application Publication No US 2014/0166949, which published patent application is incorporated herein by reference in its entirety. In an example, the chemiluminescent system used for purposes of making the chemiluminescent solution as disclosed herein comprises: a) an oxalate component comprising an oxalate ester and a solvent; b) an activator component comprising a peroxide, a catalyst, and water; c) a surfactant; and d) a fluorescer. In an example embodiment, the first chemiluminescent fluid may comprise the activator component, and the second chemiluminescent fluid may comprise the oxalate component.

The oxalate ester employed in the oxalate component may be a straight chain or a branched chain oxalate ester. Suitable straight chain oxalate esters include bis(2,4,5-trichloro-6-carbopentoxy-phenyl)oxalate, bis(2,4,5-trichloro-6-carbobutoxyphenyl)oxalate, bis(2,4,5-trichloro-6-carboisopentyloxyphenyl)oxalate, bis(2,4,5-trichlorophenyl)oxalate, bis(2,4,5-tribromo-6-carbohexoxy-phenyl)oxalate, bis(2-nitrophenyl)oxalate, bis(2,4-dinitrophenyl)oxalate, bis(2,6-dichloro-4-nitrophenyl)oxalate, bis(2,4,6-trichlorophenyl)oxalate, bis(3-trifluoro-methyl-4-nitrophenyl)oxalate, bis(2-methyl-4,6-dinitrophenyl oxalate), bis(1,2-dimethyl-4,6-dinitrophenyl)oxalate, bis(2,4-dichlorophenyl)oxalate, bis(2,4-dinitrophenyl)oxalate, bis(2,5-di-nitrophenyl)oxalate, bis(2-formyl-4-nitrophenyl)oxalate, bis(pentachlorophenyl)oxalate, bis(1,2-dihydro-2-oxo-1-pyridyl)glyoxal, bis(2,4-dinitro-6-methyl-phenyl)oxalate and bis-N-phthalimidyl oxalate.

Suitable branched chain oxalate esters include bis{3,4,6-trichloro-2-[(2-methyl-propoxy)carbonyl]phenyl oxalate, bis{3,4,6-trichloro-2-[(phenylmethoxy-carbonyl]phenyl}oxalate, bis 3,4,6-trichloro-2-[(2,2-dimethyl-propoxy)carbonyl]phenyl}oxalate and bis{3,4,6-trichloro-2-[(cyclohexylmethoxy)carbonyl]phenyl}oxalate. A preferred oxalate ester for use in the oxalate component comprises bis(2,4,5-trichloro-6-carbopentoxy-phenyl)oxalate, hereinafter referred to as "CPPO". The oxalate ester is present in the oxalate component in an amount of about 3 to about 26 wt %, and preferably 12 wt % based on the weight of the oxalate component.

Suitable solvents for use in the oxalate component include acetyl tributyl citrate, acetyl triethyl citrate, benzyl benzoate, butyl benzoate, ethyl acetate, ethyl benzoate, diethylene glycol benzoate, diethylene glycol dibenzoate, dipropylene glycol benzoate, dipropylene glycol dibenzoate (DGD), propylene glycol benzoate, ethylene glycol monobutyl ether acetate, diethylene glycol monobutyl ether acetate, propylene glycol and mixtures of two or more of the foregoing solvents. A preferred solvent for use in the oxalate component comprises DGD. A feature of DGD is that is has an extremely low vapor pressure (an indication of a liquid's evaporation rate) of about 0.0000012 mm Hg at 25° C., which is orders of magnitude less than other solvents, e.g., butyl benzoate has a vapor pressure that is about 10,000 times greater than DGD. Such reduced vapor pressure results in providing a glow solution that has little or no detectable odor, so when used and dispensed the glow solution is substantially free of odor and has no or very little smell. A further advantage of using DGD as the solvent is that it has a thickness that provides a desired flow characteristic for the glow solution in the device, e.g., the DGD has a thickness that provides optimal flow of the glow solution through the nib. The solvent may be present in the oxalate component in an amount of about 74 to about 97 wt %, based on the weight of the oxalate component.

With respect to the activator component, the peroxide may be inorganic or organic. Suitable peroxides include hydrogen peroxide, sodium peroxide, sodium perborate, sodium pyrophosphate peroxide, urea peroxide, histidine peroxide, t-butylhydroperoxide and peroxybenzoic acid. Preferably, the peroxide comprises hydrogen peroxide. The peroxide may be present in an amount of about 0.5 to about 5 wt %, based on the weight of the activator component.

Suitable examples of the catalyst employed in the activator include sodium salicylate, sodium-5-fluorosalicylate sodium-5-chlorosalicylate, sodium-5-bromo-salicylate, sodium trifluoroacetate, potassium salicylate, potassium pentachloro-phenolate, lithium salicylate, lithium-3-chloro-salicylate, lithium-5-chloro-salicylate, lithium-3,5-dichloro-salicylate, lithium-3,5,6-trichlorosalicylate, lithium-2-chloro-benzoate, lithium-5-t-butylsalicylate, lithium trifluoroacetate, rubidium acetate, tetrabutylammonium salicylate, tetrabutylammonium tetrafluoroborate, tetraethylammonium benzoate, tetrabutylammonium benzoate, tetrabutylammonium hexafluorophosphate, tetraethylammonium perchlorate, tetrabutylammonium perchlorate, tetraoctylammonium perchlorate, tetrabutylammonium-2,3,5-trichlorobenzoate, tetramethylammonium trifluoroacetate, magnesium salicylate, magnesium-5-t-butylsalicylate, magnesium-3-chlorosalicylate, magnesium-3,5-dichlorosalicylate and magnesium-3,5,6-trichlorosalicylate. Preferably, the catalyst comprises sodium salicylate. The catalyst is present in the activator component in an amount of about 0.001 to about 0.2 wt %, based on the weight of the activator component.

Water is present in the activator component in an amount of about 90 to 99 wt %, based on the weight of the activator component.

The ratio of the oxalate component to the activator component is in the range of about 5:1 to about 1:5, on a weight basis.

The surfactant employed in the activator component may be any one or more of the following classes: anionic, cationic, nonionic or amphoteric. The surfactant may consist of multiple classes of surfactants as well as multiple surfactants within each class.

Suitable anionic surfactants include ammonium laureth sulfate, ammonium lauryl sulfate, ammonium decyl sulfate, ammonium octyl sulfate, dioctyl sodium sulfosuccinate, disodium oleamide sulfosuccinate, disodium laureth sulfosuccinate, disodium dioctyl sulfosuccinate, lauryl sarcosine, cocoyl sarcosine, perfluorobutanesulfonic acid, perfluorononanoic acid, perfluorooctanesulfonic acid, perfluorooctanoic acid, potassium lauryl sulfate, potassium coco hydrolyzed collagen, sodium decyl sulfate, sodium laureth sulfate, sodium lauryl sulfate, sodium methyl cocoyl taurate, sodium lauroyl sarcosinate, sodium octyl sulfate, sodium dodecyl benzenesulfonate, triethanolamine lauryl sulfate, triethanolamine laureth sulfate and mixtures of two or more of the foregoing anionic surfactants.

Suitable cationic surfactants include lauryl dimethyl benzyl ammonium chloride; stearalkonium chloride; benzalkonium chloride; cetrimonium chloride; cetalkonium chloride; behentrimonium chloride; behentrimonium PG-trimonium chloride; dihydroxypropyl PEG-5 linoleammonium chloride; imidazolines, e.g. cocoamphocarboxyglycinate, lauroamphocarboxyglycinate, caproamphoglycinate, caproamphocarboxyglycinate; PEG-15 cocomonium chloride; polymethacrylamidopropyl trimonium chloride and mixtures of two or more of the foregoing cationic surfactants. A preferred cationic surfactant comprises lauryl dimethyl benzyl ammonium chloride.

Suitable nonionic surfactants include phenoxyethanol, alcohol ethoxylate (AEO), alkanolamides, PEG 20 cetostearyl ether, cetostearyl alcohol, cellulose ethers, cetyl alcohol, cocamide diethanolamine, cocamide monoethanolamine, decyl glucoside, glyceryl laurate, PEG ether of isocetyl alcohol, lauryl glucoside, cetylphenoxypolyethoxyethanol, nonylphenoxypolyethoxyethanol, 1-(4-nonylphenyl)-1,4,7,10,13,16,19,22,25-nonaoxa-heptacosan-1-ol, octaethylene glycol monododecyl ether, octyl glucoside, oleyl alcohol, pentaethylene glycol monododecyl ether, triblock copolymers of polypropylene glycol, polyglycerol polyricinoleate, polyoxyethylene sorbitan monooleate, polyalkylene oxide-modified polydimethylpolysiloxanes, sorbitan monostearate, sorbitan tristearate, stearyl alcohol, octyl phenol ethoxylate and mixtures of two or more of the foregoing nonionic surfactants. A preferred nonionic surfactant comprises phenoxyethanol.

Suitable amphoteric surfactants include aminopropionic acids, cocoamidopropyl betaine, lauramidopropyl betaine, cocoalkylamine acetates, cocoamidoalkylamino acetates, cocoalkylamine diacetates, cocoalkylamine propionates, cocoalkylamine dipropionates, cocoalkylamine hydroxypropyl-sulfonates, sodium cocoamidoalkylamino hydroxypropyl sulfonates, imido propionic acids, an alkyl sulfobetaine, amine oxides, N-dodecyl .beta.-alanine, sulfamic acid, dodecylamine, polyacrylamide, lauramidopropylamine oxide and mixtures of two or more of the foregoing amphoteric surfactants. A preferred amphoteric surfactant comprises lauramidopropyl betaine.

The surfactant is present in an amount of about 0.1 to about 5 wt %, based on the weight of the chemiluminescent system. In an example, the surfactant will be present in the activator component.

The fluorescer comprises a compound having a spectral emission in the range of about 300 to about 1,000 mµ. Suitable fluorescers include rubrene, 9,10-bis(phenylethynyl)anthracene, 9,10-bis(4-methoxyphenyl)-2-chloroanthracene, 1-chloro-9,10-bis(phenylethynyl)anthracene, 1,8-dichloro-9,10-bis(phenylethynyl)anthracene, 1,5-dichloro-9,10-bis(phenylethynyl)anthracene, 2,5-di-chloro-9,10-bis(phenylethynyl)anthracene, 5,12-bis(phenylethynyl) tetracene, 9,10-di-phenylanthracene, perylene, 2-methyl-9,10-bis(phenylethynyl)anthracene, 2-ethyl-9,10-bis(phenylethynyl)anthracene, 1,6,7,12-tetraphenoxy-N,N'-bis(2,6-diisopropylphenyl)-3,4,9,10-perylene dicarboximide, 1,6,7,12-tetraphenoxy-N,N'-bis(2,5-di-t-butylphenyl)-3,4,9,10-perylene dicarboximide, 1,7-dichloro-6,12-diphenoxy-N,N'-bis(2,6-diisopropyl-phenyl)-3,4,9,10-per-ylene dicarboximide, 1,6,7,12-tetra(p-bromophenoxy)N,N'-bis(2,6-diisopropylphenyl)-3,4,9,10-pe-rylene dicarboximide, 1,6,7,12-tetra(p-t-butylphenoxy)-N,N'-dineo-pentyl-3,4,9,10-perylenedicarboximide, 1,6,7,12-tetra(o-chlorophenoxy)-N,N'-bis(2,6-diisopropylphenyl)-3,4,9,10-perylene dicarboximide, 1,6,7,12-tetra(p-chloro-phenoxy)-N,N'-bis(2,6-diisopropyl-phenyl)-3,4,9,10-perylenedicarboximide, 1,6,7,12-tetra(p-fluorophenoxy)-N,N'-bis(2,6-diisopropyl-phenyl)-3,4,9,10-perylenedicarboximide, 1,6,7,12-tetra-phenoxy-N,N'-diethyl-3,4,9,10-perylene dicarboximide, 1,7-dibromo-6,12-diphenoxy-N,N'-bis(2-iso-propylphenyl)-3,4,9,10-perylene-dicarboximide, 16,17-dihexyloxyviolan-throne, 2-ethyl-9,10-bus(phenylethynyl)anthracene, 1,4-dimethyl-9,10-bis(phenylethynyl)anthracene, bis(phenylethynyl)anthracene, N,N'-didodecyl-1,6,7,12-tetrakis(4-t-butylpenoxy)-3,4,9,10-perylene tetracarboximide, N,N'-dihexa-decyl-1,6,7,12-tetrakis(4-t-butylphenoxy)-3,4,9,10-perylenedicarboximide, N,N'-di-octa-decyl-1,6,7,12-tetrakis(4-t-butylphenoxy)-3,4,9,10-perylenete-tracarboximide, 9,10-bis(4-methyl-phenyl)-2-chloroanthracene, 9,10-bis(4-ethylphenyl)-2-chloro-anthracene, 9,10-bis(4-propylphenyl)-2-chloroanthracene, 9,10-bis(4-t-butyl-phenyl-2-chloro-anthracene and mixtures of two or more of the foregoing fluorescers. A preferred fluorescer comprises 9,10-bis(4-methoxyphenyl)-2-chloro-anthracene, 9,10-diphenylanthracene or rubrene.

The fluorescer may be pre-mixed with the oxalate component, the activator component or both the oxalate component and the activator component. In an example, the fluorescer is present in the oxalate component. The fluorescer is present in an amount of about in an amount of about 0.05 to about 0.75 wt %, based on the weight of the chemiluminescent system.

The components and ingredients comprising the chemiluminescent system are provided in two different volumes such that the oxalate component is kept separate from the activator component until such time that it is desired to produce a chemiluminescent solution having the desired chemiluminescent effect. In an example embodiment, the first chemiluminescent fluid included in the container is the activator and comprises the desired peroxide, catalyst, surfactant all in an aqueous system, and the volume of second chemiluminescent fluid included in the housing is the oxalate and comprises the desired oxalate, fluorescer, and solvent.

Typically, once the chemiluminescent fluids are combined, the chemiluminescent marking solution resulting therefrom will produce a kick-off glow intensity of about 100 lux (depending on the type of fluorescer) within a few seconds after admixture of the oxalate component containing a fluorescer and the activator component containing the surfactant. The intensity of the glow will be about 25 lux after 5 minutes and gradually decrease to the point of about 2 lux after six hours. The color and intensity of the glow produced by the chemiluminescent system of the invention will be dependent upon the choice of fluorescer. For example, an orange color is produced using rubrene as the fluorescer, a green color is produced using 9,10-bis(4-methoxyphenyl)-2-chloroanthracene and a red color is produced using 9,10-diphenyl anthracene.

The following nonlimiting example shall serve to illustrate an embodiment of the chemiluminescent fluids used herein. Unless otherwise indicated, all parts and percentages are on a weight basis.

Example

The oxalate component was prepared by mixing the following ingredients: Oxalate ester: "CPPO", 60 g; Fluorescer: 2-methyl-9,10-bis(phenylethynyl)anthracene, 2 g; Solvent: dipropylene glycol dibenzoate, 438 g; TOTAL: 500 g.

The activator component was prepared by mixing the following ingredients: Peroxide: hydrogen peroxide (70%), 15 g; Catalyst: sodium salicylate, 0.3 g; Surfactant: lauramidopropyl betaine, 2.5 g; Diethylene glycol butyl ether, 10 g; Water: 472.2 g; TOTAL: 500 g.

The desired ratio of the first chemiluminescent fluid (disposed in the breakable container and comprising the activator composition) to the second chemiluminescent fluid (disposed in the internal chamber and comprising the oxalate composition) is from about 1:3 to 3:1 wt %, and in a preferred embodiment is approximately 2:3 wt %.

After the oxalate and activator components were prepared as recited above, 4 g of the oxalate component were mixed with 6 g of the activator component. The mixture was shaken for 2-3 seconds. The green glow measurements, in lux, of the resultant chemiluminescent system were as follows ("KO" indicates "kick-off", the initial glow reading taken within 5 seconds).

| KO  | 5 min | 1 hr | 2 hr | 3 hr | 4 hr | 5 hr | 6 hr |
| --- | ----- | ---- | ---- | ---- | ---- | ---- | ---- |
| 110 | 28    | 6    | 5.2  | 3.9  | 3.5  | 2.8  | 2.4  |

Although marking devices as have been described and illustrated with reference to example embodiment, it should be understood that the marking devices as disclosed herein are not limited to such specific embodiments. It will be apparent to those skilled in the art that various changes may be made without departing from the scope of the marking devices as disclosed herein.

What is claimed is:
1. A marking device comprising:
an elongate hollow housing having an inside chamber and extending from a housing first end to a housing second end, wherein the housing first end is closed;
a first chemiluminescent fluid disposed within a breakable container, wherein the breakable container is disposed within the inside chamber;
a second chemiluminescent fluid disposed within the inside chamber;
a tip assembly attached to the housing second end and comprising:
a hollow body connected with the housing second end, the body having a first end and a second end, wherein the body first end is positioned adjacent the inside chamber and the body second end is positioned adjacent a peripheral edge of the housing second end;
a nib movably disposed in the body and including a first end extending towards the housing and a second end extending towards the body second end, wherein the second end includes a tip that extends outwardly from the body second end;
a resilient element disposed within the body and imposing a biasing force on the nib urging the nib towards the body second end;
a porous material disposed over an outer surface of the nib tip and the body second opening; and a ring element disposed over the porous material and attached with the body second end such that the porous material is securely interposed in place in the tip assembly between the body and the ring;

wherein the first chemiluminescent fluid is an activator solution, and the second chemiluminescent fluid is an oxalate solution, and wherein the activator solution is an aqueous solution and includes a surfactant.

2. The marking device as recited in claim 1 wherein an inside surface of the housing second end and an outside surface of the body first end each have one or more surface features that register with one another to provide a locking attachment therebetween.

3. The marking device as recited in claim 1 wherein the housing includes a seat positioned adjacent an end of the inside chamber and extending radially inwardly a partial distance into the inside chamber, the body first end being disposed adjacent the seat.

4. The marking device as recited in claim 1 wherein the body comprises one or more locking elements that extend axially away from the body first end and that form a locking attachment with the housing inside chamber.

5. The marking device as recited in claim 1 wherein the body comprises a reduced diameter section adjacent the body second end, and wherein the nib includes a radially outwardly projecting flange between the nib first and second ends.

6. The marking device as recited in claim 1 further comprising a filter element positioned within the body between the nib and an inside surface of the body for preventing the passage of any particles to the nib tip.

7. The marking device as recited in claim 1 wherein the nib second end comprises a constant diameter section to permit a degree of inward and outward travel of the nib within the body second end.

8. The marking device as recited in claim 1 wherein the housing is formed from a flexible material, and the breakable container is sized having an outside diameter at least 60 percent that of an inside diameter of the inside chamber.

9. The marking device as recited in claim 1 wherein the first and second chemiluminescent fluids are mixed together by deforming the housing to cause the breakable container to break, wherein the mixed together chemiluminescent fluids react to provide a chemiluminescent solution that flows from the internal chamber to the tip assembly, and that is dispensed from the marking device by contacting the tip assembly against a desired surface to be marked.

10. The marking device as recited in claim 1 wherein the activator solution comprises from about 90 to 99 weight percent water based on the total weight of the activator solution.

11. A marking device comprising:
an elongate hollow housing having an inside chamber and extending from a housing first end to a housing second end, wherein the housing is formed from an elastically deformable material and the first end is closed;
a first chemiluminescent fluid disposed within a breakable container, wherein the breakable container is disposed within the inside chamber, and wherein the breakable container has a diameter that is at least 30 percent that of a diameter of the inside chamber;
a second chemiluminescent fluid disposed within the inside chamber, wherein one of the first chemiluminescent fluid and the second chemiluminescent fluid is an oxalate solution, and wherein the other of the first chemiluminescent fluid and the second of the second chemiluminescent fluid that is not the oxalate solution is an activator solution that is an aqueous solution and that includes a surfactant;
a tip assembly attached to the housing second end and comprising:
a hollow body connected with the housing second end, the body having a first end and a second end, wherein the body first end is positioned adjacent the inside chamber and the body second end is positioned adjacent a peripheral edge of the housing second end, the body having one or more surface features that register with surface features of the housing to provide a locked attachment therebetween;
a nib movably disposed in the body and including a first end extending towards the housing and a second end extending towards the body second end, wherein the second end includes a tip that extends outwardly from the body second end;
a spring disposed within the body interposed between the body first end and the nib and imposing a biasing force on the nib; and
a porous material disposed over an outer surface of the nib tip and the body second opening and secured to the body second end; and
wherein a chemiluminescent solution is formed by deforming the housing to cause the breakable container to break to cause the first and second chemiluminescent fluids to mix and react to form a chemiluminescent solution, and wherein the chemiluminescent solution flows from the internal chamber to the tip assembly and is dispensed from the body second end by the nib and porous material.

12. The marking device as recited in claim 11 wherein the spring is disposed around a portion of the nib first end, and the nib includes a flange adjacent the first end that extends radially outwardly a distance therefrom.

13. The marking device as recited in claim 11 wherein the body includes a reduced diameter section adjacent the body second end, and wherein the nib flange contacts an inside wall of the reduced diameter section to stop the flow of the chemiluminescent solution from the tip assembly.

14. The marking device as recited in claim 11 wherein the body includes one or more attachment elements extending from the body first end that are disposed within the housing and form a locking attachment between the body and housing.

15. The marking device as recited in claim 11 wherein the nib comprises a first diameter section extending axially a distance from the nib first end, a flange extending radially a distance from the first diameter section, and a second diameter section extending a distance axially from the flange, wherein the nib tip is positioned at the nib second end.

16. A marking device for dispensing a marking solution comprising:
a housing having an inside chamber extending from a housing first end to a housing second end, wherein the housing first end is closed and the housing second end is open;
a volume of a marking solution disposed within the inside chamber;
a tip assembly attached to the housing and comprising:
a hollow body disposed within the housing second end, the body having a first end and a second end, wherein the body first end is open and positioned adjacent to and in fluid-flow communication with the inside chamber, wherein the body second end is open and positioned adjacent a peripheral edge of the housing second end, the body including an inwardly tapered section moving from the body first end to the body second end;

a nib disposed in the body and including a first end extending axially towards the housing and a second end extending axially towards the body second end, the nib second end having a tip that extends outwardly from the body second end;

a spring disposed within the body and imposing a biasing force on the nib urging the nib towards the body second end;

a porous material disposed over an outer surface of the nib tip and the body second opening; and a ring element disposed over the porous material and attached with the body second end such that the porous material is securely interposed in place in the tip assembly between the body and the ring;

wherein the marking solution is a chemiluminescent solution, and wherein the chemiluminescent solution is formed by breaking a container comprising a first chemiluminescent fluid to mix with a second chemiluminescent fluid already disposed within the internal chamber, wherein the container is broken by bending or squeezing the housing, and wherein the first chemiluminescent fluid is an activator solution, and the second chemiluminescent fluid is an oxalate solution, and wherein the activator solution is an aqueous solution and comprises a surfactant.

17. The marking device as recited in claim 16 wherein the body includes one or more attachment elements extending axially from the body first end that provide a locking attachment with the housing.

18. The marking device as recited in claim 16 comprising a filter element that is disposed within the tip assembly and that is positioned between the nib and an inside wall surface of the body so as to prevent the passage of any particles from the broken container to travel to the tip.

19. The marking device as recited in claim 16 wherein the activator solution comprises from about 90 to 99 weight percent water based on the total weight of the activator solution.

* * * * *